United States Patent
Absmeier et al.

(10) Patent No.: US 7,562,588 B2
(45) Date of Patent: Jul. 21, 2009

(54) METHOD AND APPARATUS FOR CONTROLLING MASS FLOW RATE OF RECYCLED ANODE TAIL GAS IN SOLID OXIDE FUEL CELL SYSTEM

(75) Inventors: John P. Absmeier, Rochester, NY (US); Sean M. Kelly, Pittsford, NY (US); Gail E. Geiger, Caledonia, NY (US)

(73) Assignee: Delphi Technologies, Inc., Troy, MI (US)

( * ) Notice: Subject to any disclaimer, the term of this patent is extended or adjusted under 35 U.S.C. 154(b) by 642 days.

(21) Appl. No.: 11/412,620

(22) Filed: Apr. 27, 2006

(65) Prior Publication Data
US 2007/0251297 A1    Nov. 1, 2007

(51) Int. Cl.
    *G01P 5/06*    (2006.01)
(52) U.S. Cl. .................................................. 73/861.85
(58) Field of Classification Search .............. 73/861.85, 73/23.2; 429/19, 39, 17
See application file for complete search history.

(56) References Cited

U.S. PATENT DOCUMENTS

| | | | |
|---|---|---|---|
| 6,269,286 B1* | 7/2001 | Tse et al. | 700/271 |
| 6,887,390 B2* | 5/2005 | Mohedas et al. | 210/777 |
| 2008/0141590 A1* | 6/2008 | Haltiner et al. | 48/197 R |

* cited by examiner

*Primary Examiner*—Jewel Thompson
(74) *Attorney, Agent, or Firm*—Paul L. Marshall

(57) ABSTRACT

In an SOFC stack system, a reformer supplies reformate to the stack. An anode tail gas portion is recycled into the reformer. An inline flowmeter indicates an apparent recycle flow rate. A map of anode tail gas composition as a function of fuel utilization efficiency U, reformer oxygen/carbon ratio O:C, and recycle percentage R is generated on a laboratory test bed at various recycle rates and fuel utilization rates. Compositions are sent through a flowmeter and a Coriolis mass flowmeter provide a Coriolis flow and sensor voltage function across the various compositions and flow rates to create an average curve and an average (reference) voltage at a given flow. A scale factor Z is calculated and used to determine a scaled sensor voltage X for use in an average flow polynomial curve fit equation to calculate tail gas mass flow rate at any flow value indicated by the flow meter.

6 Claims, 6 Drawing Sheets

FIG. 3.

| MOLAR | U=40% | U=50% | U=60% |
|---|---|---|---|
| R=10% | H2=21.4%<br>H20=16.8%<br>CO=9.3%<br>CO2=9.7%<br>CH4=0.0%<br>O2=0.0%<br>N2=42.2% | H2=18.3%<br>H20=21.1%<br>CO=8.5%<br>CO2=11.2%<br>CH4=0.0%<br>O2=0.0%<br>N2=40.4% | H2=15.2%<br>H20=24.0%<br>CO=5.9%<br>CO2=13.7%<br>CH4=0.0%<br>O2=0.0%<br>N2=40.7% |
| R=20% | H2=22.5%<br>H20=17.8%<br>CO=9.8%<br>CO2=10.4%<br>CH4=0.0%<br>O2=0.0%<br>N2=39.0% | H2=19.2%<br>H20=22.3%<br>CO=8.4%<br>CO2=12.3%<br>CH4=0.0%<br>O2=0.0%<br>N2=37.2% | H2=15.5%<br>H20=27.7%<br>CO=6.5%<br>CO2=15.1%<br>CH4=0.0%<br>O2=0.0%<br>N2=34.8% |
| R=30% | H2=24.6%<br>H20=18.8%<br>CO=10.7%<br>CO2=11.0%<br>CH4=0.0%<br>O2=0.0%<br>N2=34.5% | H2=21.2%<br>H20=24.7%<br>CO=9.2%<br>CO2=13.7%<br>CH4=0.0%<br>O2=0.0%<br>N2=30.8% | H2=18.2%<br>H20=30.0%<br>CO=7.6%<br>CO2=16.5%<br>CH4=0.0%<br>O2=0.0%<br>N2=27.4% |
| R=40% | H2=27.5%<br>H20=21.2%<br>CO=12.0%<br>CO2=12.4%<br>CH4=0.0%<br>O2=0.0%<br>N2=26.6% | H2=25.2%<br>H20=27.8%<br>CO=11.0%<br>CO2=15.5%<br>CH4=0.0%<br>O2=0.0%<br>N2=20.3% | H2=22.1%<br>H20=36.5%<br>CO=9.2%<br>CO2=20.1%<br>CH4=0.0%<br>O2=0.0%<br>N2=11.9% |

| R \ U | U=40% | U=50% | U=60% |
|---|---|---|---|
| R=10% | A | E | I |
| R=20% | B | F | J |
| R=30% | C | G | K |
| R=40% | D | H | L |

FIG. 7.

| COMPOSITION | CORIOLUS FLOW (GPS) | SENSOR OUTPUT (V) | SCALED VOLTAGE (V) | CALC FLOW (GPS) | PERCENT ERROR |
|---|---|---|---|---|---|
| A | 0.369 | 2.79 | 2.7966 | 0.3791 | 1.559% |
| A | 0.736 | 3.47 | 3.4828 | 0.7470 | 1.059% |
| A | 1.477 | 4.32 | 4.3376 | 1.4925 | 1.059% |
| B | 0.373 | 2.83 | 2.7931 | 0.3778 | 1.394% |
| B | 0.744 | 3.53 | 3.4927 | 0.7538 | 1.293% |
| B | 1.492 | 4.38 | 4.3260 | 1.4803 | 0.755% |
| C | 0.373 | 2.89 | 2.7895 | 0.3754 | 0.902% |
| C | 0.748 | 3.63 | 3.4996 | 0.5686 | 1.431% |
| C | 1.489 | 4.50 | 4.3358 | 1.4905 | 0.083% |
| D | 0.379 | 3.03 | 2.8256 | 0.3905 | 1.597% |
| D | 0.761 | 3.74 | 3.4848 | 0.7484 | |
| D | 1.503 | 4.62 | 4.3002 | 1.4532 | |
| E | 0.383 | 2.69 | 2.7892 | 0.3763 | 1.705% |
| E | 0.757 | 3.35 | 3.4802 | 0.7452 | 1.550% |
| E | 1.513 | 4.19 | 4.3459 | 1.5013 | 0.768% |
| F | 0.381 | 2.75 | 2.7982 | 0.3798 | 0.219% |
| F | 0.758 | 3.41 | 3.4719 | 0.7395 | |
| F | 1.509 | 4.28 | 4.3396 | 1.4947 | 0.971% |
| G | 0.387 | 2.82 | 2.7936 | 0.3780 | |
| G | 0.762 | 3.52 | 3.4937 | 0.7545 | 0.946% |
| G | 1.509 | 4.37 | 4.3357 | 1.4905 | 1.222% |
| H | 0.382 | 2.97 | 2.8031 | 0.3817 | 0.114% |
| H | 0.758 | 3.71 | 3.5060 | 0.7630 | 0.641% |
| H | 1.462 | 4.55 | 4.2954 | 1.4482 | 0.951% |
| I | 0.382 | 2.59 | 2.7797 | 0.3727 | 0.343% |
| I | 0.757 | 3.25 | 3.4937 | 0.7545 | 0.906% |
| I | 1.508 | 4.06 | 4.3629 | 1.5194 | |
| J | 0.381 | 2.61 | 2.7765 | 0.3715 | 0.760% |
| J | 0.753 | 3.29 | 3.5005 | 0.7592 | 0.998% |
| J | 1.503 | 4.10 | 4.3612 | 1.5176 | 1.512% |
| K | 0.383 | 2.71 | 2.7904 | 0.3758 | 0.188% |
| K | 0.751 | 3.41 | 3.5045 | 0.7620 | 1.196% |
| K | 1.487 | 4.21 | 4.3305 | 1.4850 | |
| L | 0.378 | 2.59 | 2.8208 | 0.3886 | |
| L | 0.753 | 3.59 | 3.5052 | 0.7624 | |
| L | 1.352 | 4.37 | 4.2707 | 1.4227 | 1.224% |

METHOD AND APPARATUS FOR CONTROLLING MASS FLOW RATE OF RECYCLED ANODE TAIL GAS IN SOLID OXIDE FUEL CELL SYSTEM

This invention was made with United States Government support under Government Contract/Purchase Order No. DE-FC26-02NT41246 awarded by DOE. The Government has certain rights in this invention.

TECHNICAL FIELD

The present invention relates to solid oxide fuel cell (SOFC) systems; more particularly, to such systems wherein a portion of the anode tail gas from an SOFC stack is re-used by recycle; and most particularly, to a system for controlling the mass flow rate of anode tail gas being recycled in an SOFC system.

BACKGROUND OF THE INVENTION

SOFC stack systems are well known. An SOFC typically is fueled by reformate gas, which is the partially oxidized effluent from a catalytic partial oxidation (CPOx) hydrocarbon reformer. Reformate typically includes amounts of carbon monoxide (CO) as fuel in addition to molecular hydrogen ($H_2$). Because an SOFC stack system is less than 100% fuel efficient, the spent tail gas from the anodes of the stack, also known as anode tail gas or syngas, contains substantial amounts of hydrogen and carbon monoxide, as well as water vapor. To improve stack power density and system efficiency and to reduce carbon precipitation and deposition in the system, it is known in the art to recycle a portion of the tail gas from the stack anodes into either the inlet to the reformer or the inlet to the stack.

In the fuel cell prior art, there is no simple and inexpensive means disclosed for determining accurately the instantaneous mass flow rate of tail gas, which flow rate is necessary in order to control the flow rate to a predetermined control setpoint.

It is known to measure gas flow rates by various means, for example, by turbine meters or by hot wire anemometers. A problem with simply using the output signal of such a gas flow meter is that the molecular composition of tail gas may vary widely over the operating range of a fuel cell stack. Such known flow meters are sensitive to variations in composition of the gas and hence are not directly reliable.

What is needed in the art is a system for calibrating a gas flowmeter to provide accurate measurement and control of anode tail gas recycle flow rates over a wide range of SOFC system operating conditions and recycle mass flow rates.

It is a principal object of the present invention to improve the fuel efficiency of a solid oxide fuel cell stack.

SUMMARY OF THE INVENTION

Briefly described, in an SOFC stack system in accordance with the invention, a conventional CPOx reformer supplies reformate to the stack. A portion of the resulting anode tail gas, which is rich in $H_2$, $CO_2$, and $H_2O$, is recycled by a recycle pump into the reformer inlet. Recycle flow rate is varied by varying the speed of the pump. The apparent recycle flow rate is indicated by an inline gas flowmeter. What is needed is method and apparatus for converting any indicated flow rate to a true flow rate in order to adjust correctly the speed of the recycle pump to provide a target mass flow rate of recycled anode tail gas.

A multivariate map of anode gas composition as a function of fuel utilization efficiency U, reformer oxygen/carbon ratio O:C, and recycle percentage R is generated on a laboratory test bed. The composition is characterized in terms of hydrogen, water, carbon monoxide, carbon dioxide, methane, oxygen, and nitrogen. For analysis, the number of compositions is reduced to a workable number, for example, 12 corresponding to recycle rates of 10%, 20%, 30% and 40% at fuel utilization rates of 40%, 50% and 60%. The compositions are sent through a representative hot-wire flowmeter and also a Coriolis mass flowmeter which is sensitive to only mass and density changes. The hot-wire and Coriolis flow values when plotted against each other provide a Coriolis flow and mass flow sensor voltage function across the various compositions and flow rates to create an average curve and an average (reference) voltage at a given flow. Using the average reference voltage rather than individual reference voltages is valid because the resulting error across all flow rates is less than 1%. A scale factor Z is calculated and used to determine a scaled sensor voltage X for use in an average flow polynomial curve fit equation to calculate actual tail gas mass flow at any mass flow value indicated by the hot-wire flow meter. An error signal is generated between a target tail gas mass flow and the actual, and the speed of the recycle pump is adjusted accordingly.

BRIEF DESCRIPTION OF THE DRAWINGS

The present invention will now be described, by way of example, with reference to the accompanying drawings, in which:

FIG. 3 is a table showing molecular compositions of anode tail gas in the SOFC system shown in FIG. 1 for four recycle percentages at three fuel utilization percentages;

FIG. 7 is a table showing percent error of calculated flow versus actual Coriolis flow for the compositions and flow rates shown in FIGS. 3 and 5.

DESCRIPTION OF THE PREFERRED EMBODIMENTS

Figure 1:
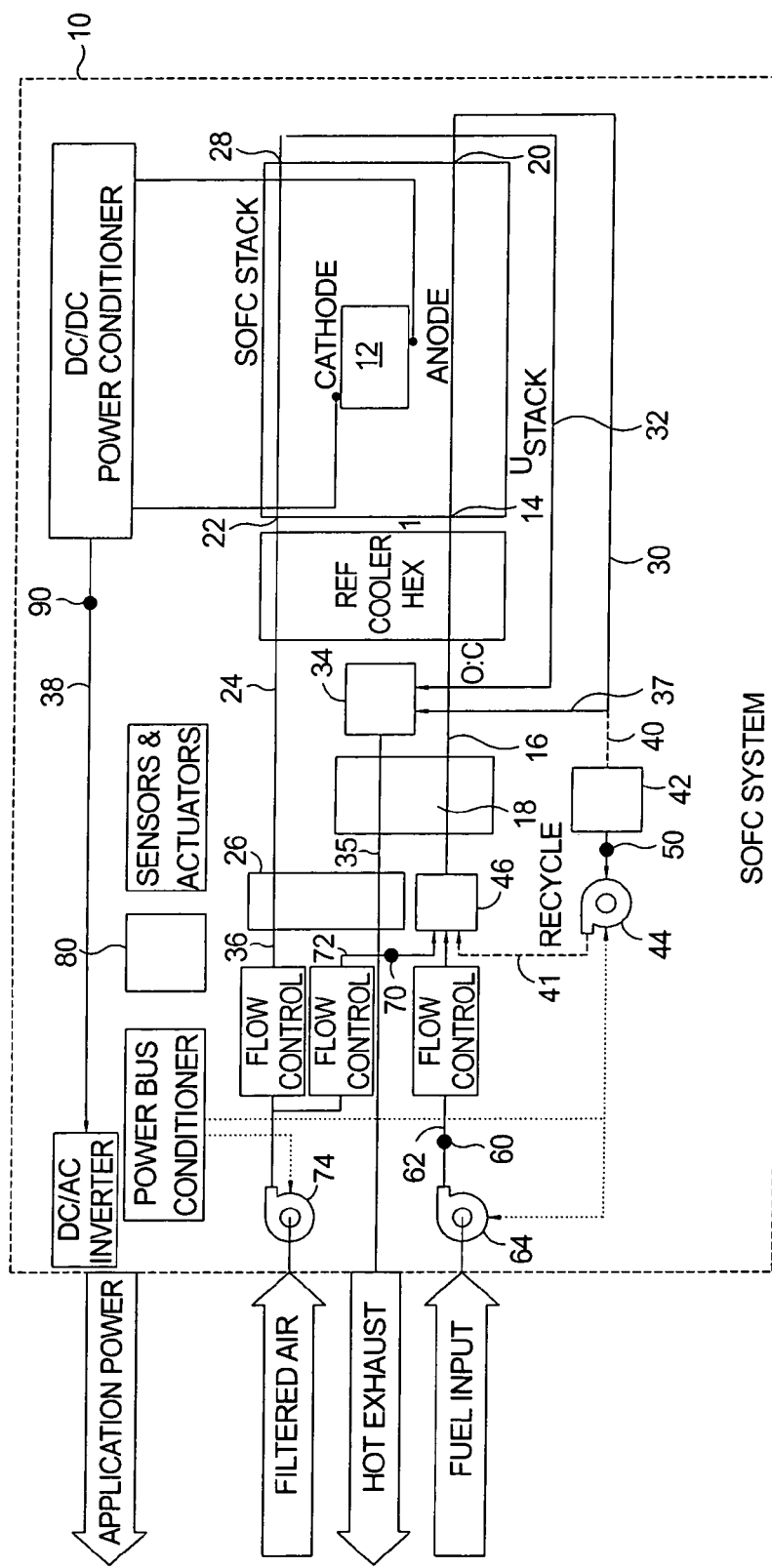
FIG. 1 is a schematic flow diagram of an SOFC system including recycle of anode tail gas into the fuel stream ahead of the reformer.

Referring to FIG. 1, an SOFC system 10 in accordance with the invention comprises an SOFC stack 12 having an anode inlet 14 for reformate 16 from a CPOx reformer 18; an anode tail gas outlet 20; an inlet 22 for heated cathode air 24 from a cathode air heat exchanger 26; and a cathode air outlet 28. Anode tail gas 30 and spent cathode air 32 are fed to a burner 34, the hot exhaust 35 from which is passed through heat exchanger 26 to heat the incoming cathode air 36. Thus, residual energy in a first portion 37 of anode tail gas is partially recovered as heat energy in exchanger 26.

In addition, a second portion 40 of anode tail gas 30 is diverted ahead of burner 34 to an anode tail gas cooler 42 and thence through an anode tail gas source 44, such as a pump, which directs cooled portion 41 into an entrance to an air/fuel preparation chamber 46 ahead of CPOx reformer 18. Thus, a second portion of residual hydrocarbons in the anode tail gas is exposed to reforming for a second time, and heat is recovered in both the reformer and the cathode air heater. System 10 is known to improve significantly the fuel efficiency of an SOFC system over non-recycle prior art systems, resulting in an increase in electrical output 38.

System 10 further includes an anode tail gas flow sensor 50 for indicating a flow rate of recycled anode tail gas 40,41. Device 50 may comprise a hot-wire anemometer, turbine meter, or other gas flow measurement device that does not include compensation for changes in composition or density of the gas flowing therethrough. System 10 further includes a fuel flow sensor 60 for sensing flow rate of fuel 62 being sent to reformer 18 by fuel source 64, such as for example a pump; a reformer air flow sensor 70 for sensing flow rate of air 72 being sent to reformer 18 by air source 74, such as a blower; an electronic controller 80; and a current sensor 90 for sensing output of stack 12.

Figure 2:
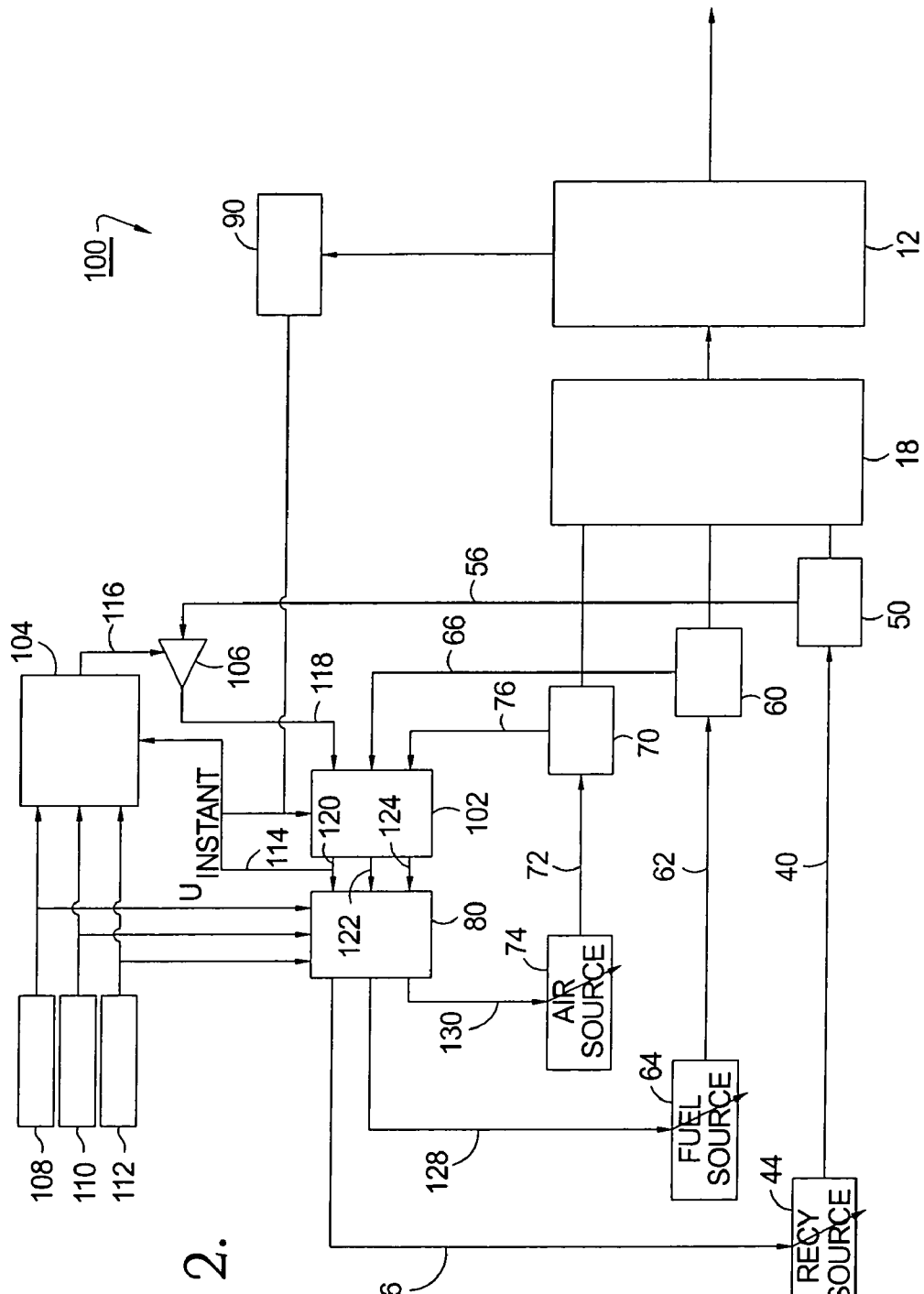
FIG. 2 is a schematic flow diagram of an algorithm for controlling anode tail gas mass flow in the SOFC system shown in FIG. 1.

Referring to FIG. 2, a schematic flow diagram is shown of an algorithm 100 for closed-loop iterative control of anode tail gas mass flow in the SOFC system shown in FIG. 1. Algorithm 100 includes a tail gas composition predictor 102, a sensor error compensator 104, and a signal adjuster 106 as described below. Tail gas composition is predictable as a function of fuel utilization U, percent recycle flow R, and the oxygen/carbon ratio O:C of the tail gas. The invention comprises a methodology to dynamically compensate for flow measurement error in the output of tail gas flow sensor 50 based on predicted system operation. Because U and O:C can be set and directly measured, or calculated from direct measurements, the correct corresponding tail gas composition can be predicted. Because the voltage output of the tail gas flow sensor is variable not only with tail gas flow rate but also with tail gas composition, a scale factor must be applied to each voltage measured over the anticipated operating range of the fuel cell system, and the scale factor will differ for different measured flow rates. The appropriate scale factor is calculated and provided by compensator 104.

In operation of algorithm 100, controller 80 receives input signals for a target R 108, a target O:C 110, and a target U 112, which target values are also sent to compensator 104. Using internal algorithms (not shown) in known fashion, controller 80 calculates the proper settings for air source 74, fuel source 64, and tail gas recycle source 44. Air flow sensor 70 senses the air flow 72 and sends a signal 76 to predictor 102. Fuel flow sensor 60 senses fuel flow 62 and sends a signal 66 to predictor 102. Tail gas recycle flow sensor 50 senses the flow of portion 40 and sends a raw signal 56 to signal adjustor 106. The instantaneous fuel utilization $U_{instant}$ 114 is sent from predictor 102 to compensator 104 which calculates a voltage scale factor Z 116 which is applied to signal 56 by signal adjustor 106, and a corrected recycle signal X 118 is sent to predictor 102. Predictor 102 outputs actual values for instantaneous R 120, instantaneous O:C 122, and instantaneous U 124 to controller 80. In a closed loop control, controller 80 iteratively compares the actual instantaneous values 120,122, 124 to the target values 108,110,112, respectively, and calculates and sends respective adjustment signals 126,128,130 to pumps 44,64,74 as may be required.

Figures 4, 5:
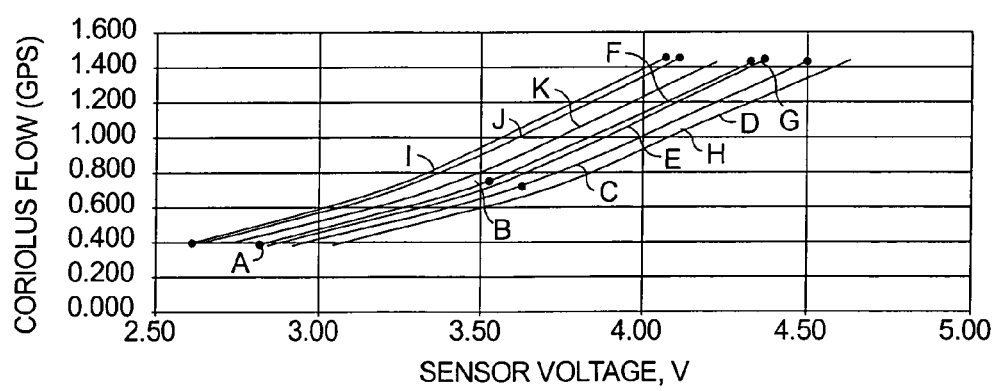
FIG. 4 is an alphabetic key to the compositions shown in FIG. 3.
FIG. 5 is a graph of results from each of the compositions shown in FIGS. 3 and 4, showing signal voltage of a recycle gas flow sensor versus composition flow in grams per second past the sensor.

Referring to FIGS. 3 through 5, in implementing a control method in accordance with the invention, a multivariate table 200 is generated wherein the molar composition of elements and compounds in anode tail gas 40 is determined for steady state operation of SOFC stack 12 at a range of percentages of recycle and fuel utilization. In the example shown, the compositions are determined at recycle rates of 10%, 20%, 30% and 40% for fuel utilization rates of 40%, 50%, and 60%, giving rise to 12 separate compositions coded as A through L (FIG. 4). Referring to FIG. 5, compositions A through L are passed over a range of flow rates through both a conventional non-compensating flow meter 50, for example, a hot-wire anemometer or turbine meter as might be economically used on a fuel cell system (x-axis values), and a Coriolus mass flow meter as is known in the art to be sensitive to only the mass-average of the gas passing through it (y-axis values). The results are plotted in FIG. 5, wherein the maximum difference in sensor voltage response is between compositions D and I which represent the extremes of hydrogen content in the anode tail gas.

Figure 6:
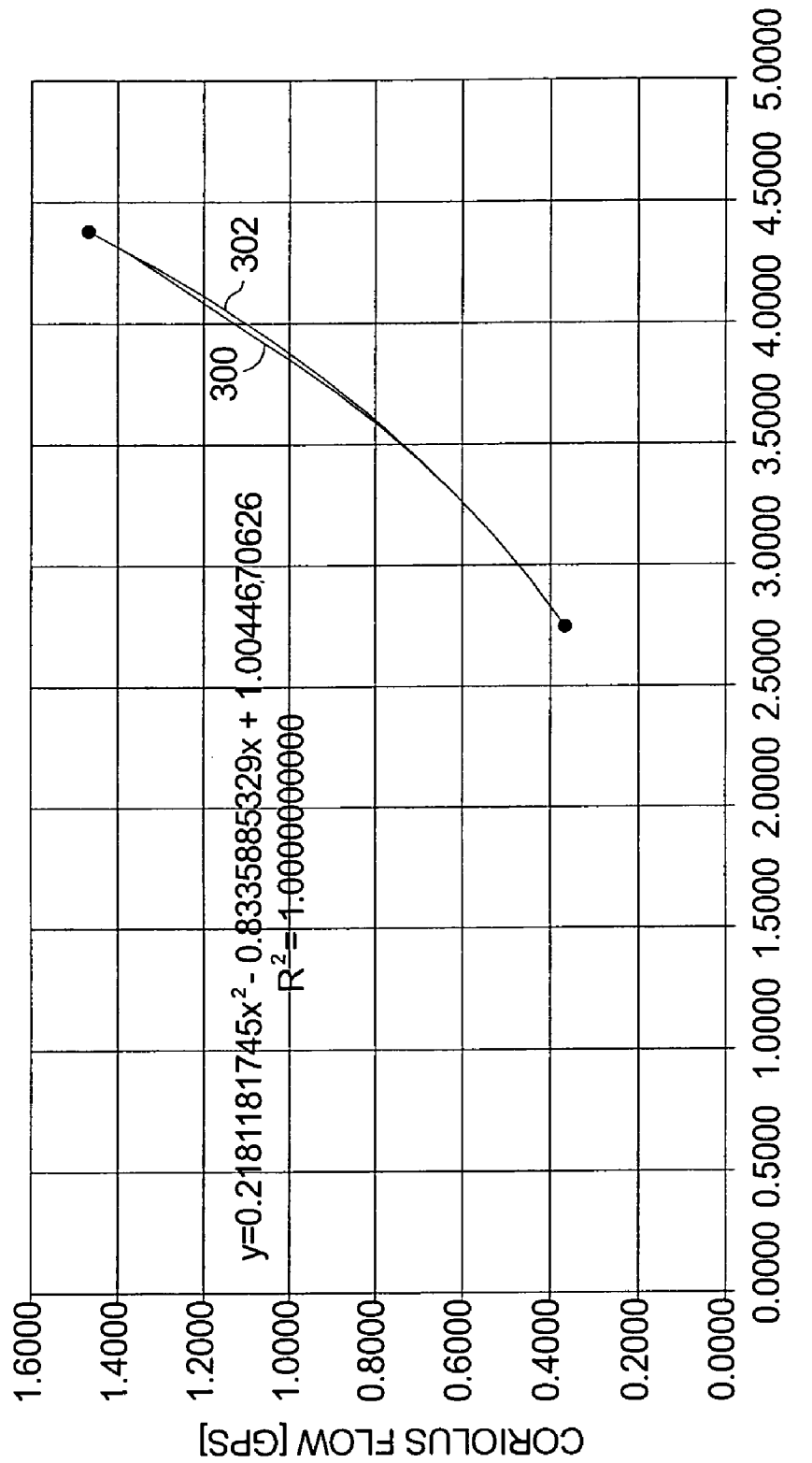
FIG. 6 is a graph of an average of the curves shown in FIG. 5 and a root mean squared best fit curve in accordance with the polynomial equation shown.

Referring to FIG. 6, an average correlation curve 300 is plotted from the averages of the individual flow-response curves shown in FIG. 5, and an RMS analysis results in fit curve 302, the polynomial equation for which is:

$$Y = 0.2181181745 X^2 - 0.8335885329 X + 1.0044670626 \quad \text{(Eq. 1)}$$

wherein R2=1.0000000000, and wherein X is the scaled voltage for sensor 50 for any composition case of interest Y. The error between measured and calculated values for all points is less than 6%.

A voltage scale factor Z is defined as the ratio of a reference voltage $V_{reference}$ to the measured output voltage $V_{case}$ from sensor 50 in any flow/composition case of interest. The reference voltage is the average at any given Coriolus flow value of the measured voltages 56 for the 12 compositions. An average scale factor across all flows $Z_{average}$ is determined and a scaled sensor voltage X is determined as the product of $Z_{average}$ and $V_{case}$ for any given flow:

$$X = (Z_{average})(V_{case}) \quad \text{(Eq. 2)}$$

The thus-determined scaled sensor voltage X is entered into Eq. 1 to determine a corrected sensor voltage Y.

Table 200 is predetermined by laboratory experimentation and is embedded in the logic in compensator 104 (which table may be present as an algorithm rather than a literal table, allowing for interpolation among compositions A through L).

In operation of an SOFC stack 12 in accordance with algorithm 100, when a target recycle value R 108, target O:C value 110, and target U value 112 are entered into compensator 104, the compensator looks up a corresponding scale factor Z from Table 200. Scale factor Z 116 is applied to the raw sensor voltage 56 to generate a scaled sensor voltage X 118. Eq. 1 is embedded in the logic in predictor 102. Scaled sensor signal voltage 118 is entered into Eq. 1 to calculate an actual, corrected R 120 inputted into controller 80 which sends a signal 126 to adjust the speed of recycle pump 44 as may be needed to cause corrected R 120 to equal target recycled tail gas R 108. The closed loop is repeated continuously during operation of the fuel cell stack to assure that the target tail gas flow 108 is continuously maintained.

Referring to FIG. 7, Table 400 shows percent error of calculated flow versus actual Coriolus flow for the compositions and flow rates shown in FIGS. 3 and 5 calculated in accordance with a method of the invention. It is seen that all errors are within +/−2%.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for measuring mass flow rate of anode tail gas being recycled from an anode in a solid oxide fuel cell stack into a reformer ahead of the anode, comprising the steps of:
   a) providing a variable tail gas source for variably supplying said anode tail gas;
   b) providing a sensor for sensing an apparent mass flow rate of said anode tail gas into said reformer and for providing a raw voltage signal indicative thereof;
   c) determining a voltage scale factor;
   d) applying said voltage scale factor to said raw voltage signal to provide a scaled voltage signal; and
   e) applying said scaled voltage signal to a normalized calibration equation to calculate said tail gas mass flow rate.

2. A method in accordance with claim 1 wherein said sensor is selected from the group consisting of a hot-wire anemometer and a turbine meter.

3. A method in accordance with claim 1 wherein said variable tail gas source is a recycle pump.

4. A method in accordance with claim 1 wherein said step of determining said voltage scale factor includes the steps of:
   a) determining the elemental and molecular composition of said anode tail gas over a range of operating conditions including recycle percentage, fuel utilization percentage, and oxygen/carbon ratio; and
   b) measuring the voltage response of said sensor means at various flow rates for various of said compositions in terms of corresponding mass flow rate as determined by a mass flow meter.

5. A method in accordance with claim 1 wherein said normalized calibration equation is a polynomial equation wherein said true tail gas flow is a quadratic function of said scaled voltage signal.

6. A method for controlling mass flow rate of anode tail gas being recycled from an anode in a solid oxide fuel cell stack into a reformer ahead of the anode, comprising the steps of:
   a) providing a variable tail gas source for variably supplying said anode tail gas;
   b) providing a sensor for sensing an apparent mass flow rate of said anode tail gas into said reformer and for providing a raw voltage signal indicative thereof;
   c) determining a voltage scale factor;
   d) applying said voltage scale factor to said raw voltage signal to provide a scaled voltage signal;
   e) applying said scaled voltage signal to a normalized calibration equation to calculate said tail gas mass flow rate;
   f) comparing said calculated tail gas mass flow rate to a target tail gas mass flow rate, and determining an error term;
   g) using said error term to calculate a corrected output rate for said variable supplying means; and
   h) adjusting the output rate of said variable tail gas source to said corrected output rate to supply said anode tail gas to said reformer at said target tail gas mass flow rate.

* * * * *